Figure 3:
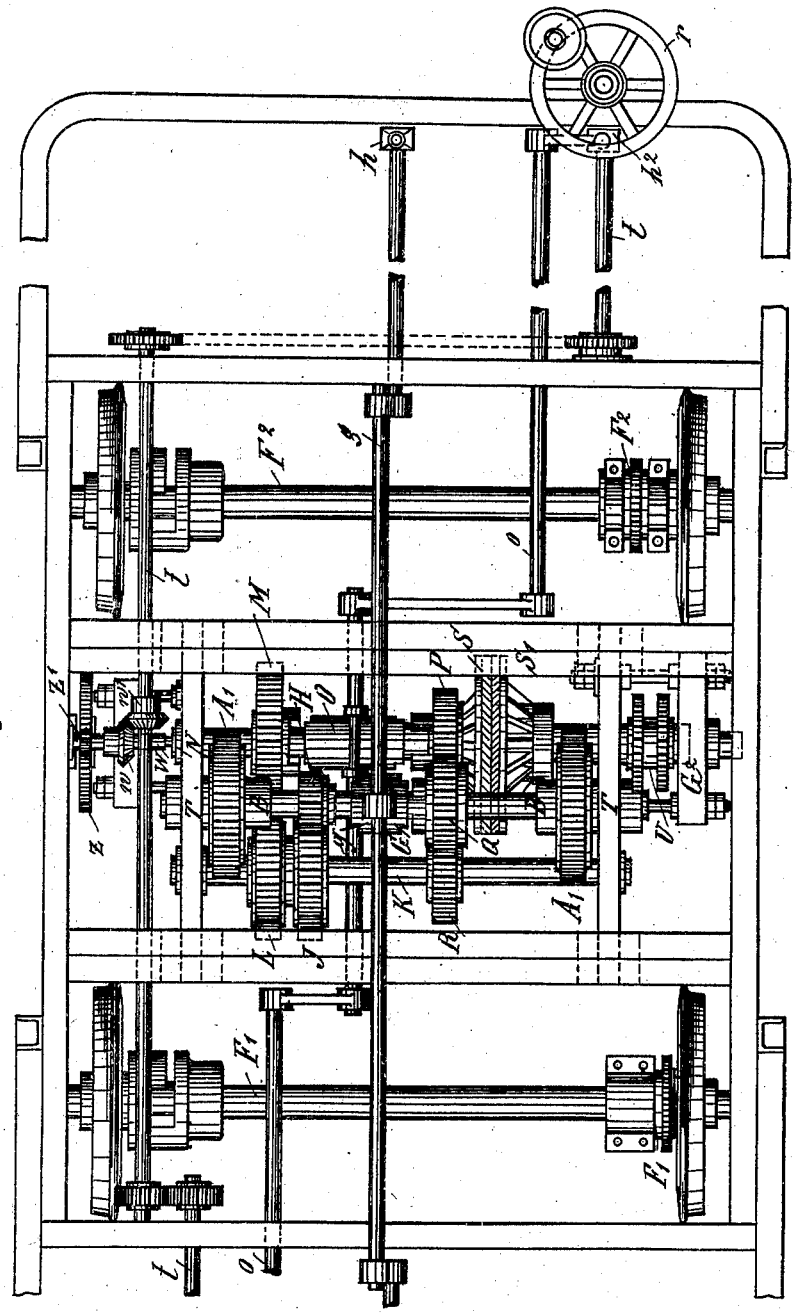

(No Model.) 3 Sheets—Sheet 1.
C. LÜHRIG.
TRAMWAY VEHICLE.
No. 502,442. Patented Aug. 1, 1893.
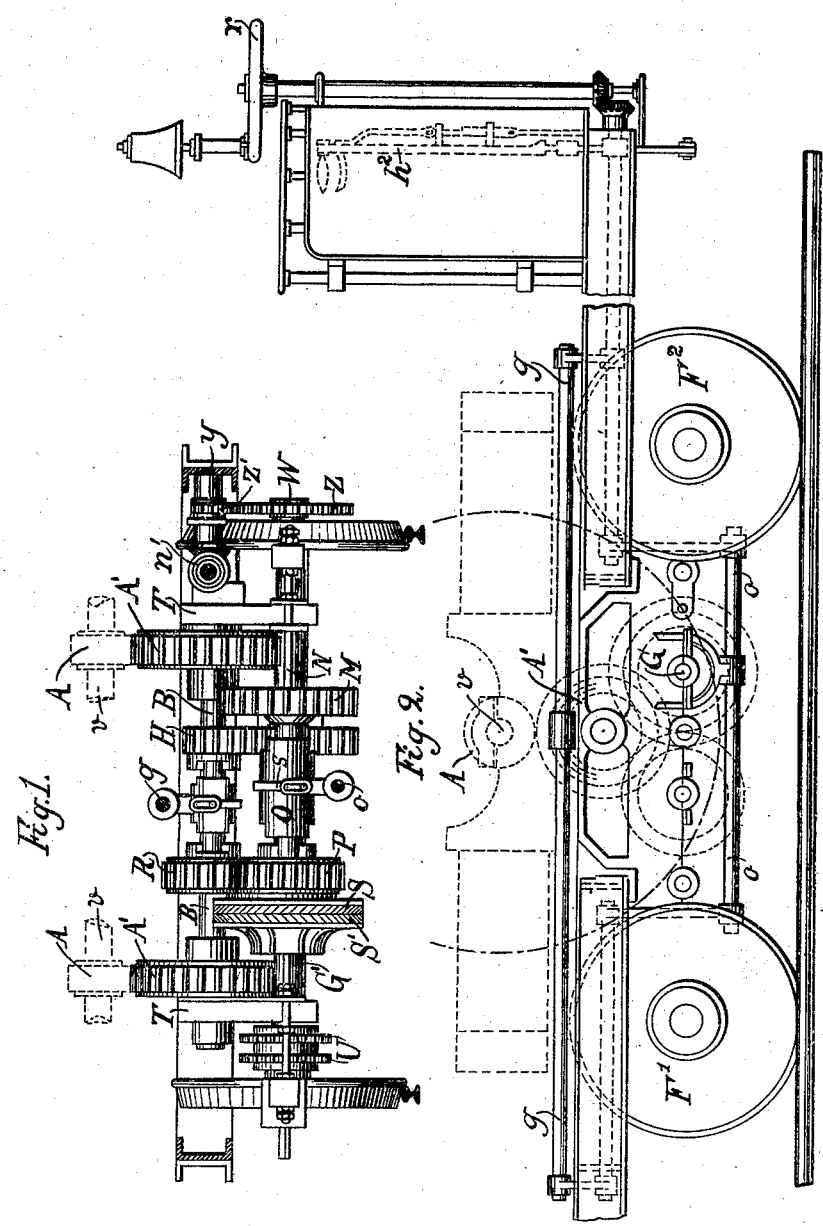
WITNESSES:
INVENTOR:
Carl Lührig
BY _____ ATTY (No Model.)   3 Sheets—Sheet 2.

C. LÜHRIG.
TRAMWAY VEHICLE.

No. 502,442.   Patented Aug. 1, 1893.

Witnesses:

Inventor:
Carl Lührig
By A. Faber du Faur
Attorney.

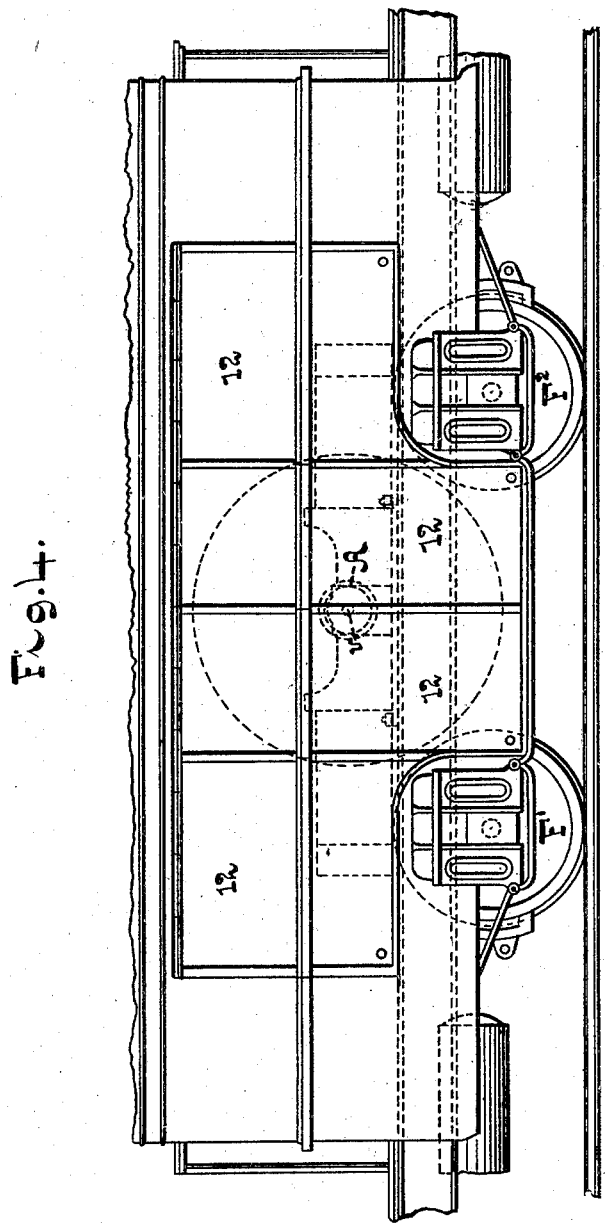

UNITED STATES PATENT OFFICE.

CARL LÜHRIG, OF DRESDEN, GERMANY.

TRAMWAY-VEHICLE.

SPECIFICATION forming part of Letters Patent No. 502,442, dated August 1, 1893.

Application filed October 11, 1892. Serial No. 448,580. (No model.) Patented in Luxemburg August 26, 1892, No. 1,680.

*To all whom it may concern:*

Be it known that I, CARL LÜHRIG, a subject of the King of Saxony, residing at Dresden, in the Kingdom of Saxony, German Empire, have invented new and useful Improvements in Tramway-Vehicles Driven by Motor-Engines, (for which I have obtained Letters Patent in Luxemburg, No. 1,680, dated August 26, 1892,) of which the following is a specification.

This invention relates to the construction and arrangement of motor engines and driving gear of tramway vehicles propelled by motor engines.

It is a well known disadvantage in tramway vehicles propelled by gas or petroleum motor engines that the unavoidable odor of combustion passes into the carriage and becomes a nuisance to the passengers. It has heretofore always been necessary in such carriages either to provide a separate compartment as engine room, or even to employ an entirely separate vehicle as locomotive. The cumbrous appearance and the great expense of construction and working caused by such arrangements, more particularly on account of the necessary turntables or reversing sidings, have materially hindered the extended use of such tramway vehicles. According to the present invention, the motor engines and driving gear are so arranged that they are not visible from the outside. The motor engines (two twin engines) are housed beneath the two longitudinal seats of the vehicle, while their fly wheels are contained within the hollow sides thereof. By this arrangement it is possible to entirely cut off all communication between the engines and the interior of the vehicle, in such a manner that neither odor nor noise penetrates into the latter. The gas or petroleum reservoirs are situated, together with the pressure regulators and the exhaust chambers beneath the floor of the vehicle, and the entire driving gear is arranged compactly in the smallest possible space in the middle of the framing between the two wheel axles. The motor engines are each mounted on a frame so that after lifting up the flap like parts of the sides of the vehicle from the outside, they can be drawn out with their frames, and be exchanged for others kept in stock without difficulty and in a few minutes. With the same rigidity and facility the driving gear can be removed as a whole and can be replaced by a new one, for which purpose it is only necessary to run the carriage upon the pit siding and unscrew holding down bolts, thereby disengaging the gear from the frame.

In the accompanying drawings, Figure 1 is a cross section of the carriage frame provided with the driving gear. Fig. 2 is a side view; Fig. 3 a plan, and Fig. 4 a side elevation showing the hinged doors.

Similar letters of reference indicate corresponding parts.

On the two crank shafts $v$ of the twin engines are fixed spur wheels A, A gearing with larger wheels A', A' fixed on the shaft B. On this shaft are also located two loose wheels H and Q of unequal diameter and between them is the clutch G, sliding on but rotating with the shaft, so as to gear with the coupling of either wheel H or Q, according as it is desired to run at a high or low speed. The smaller wheel H on shaft B gears with a large wheel J on the countershaft K, while the large wheel Q gears with one of equal size R,—so that by this means the shaft K has either a fast or a slow motion imparted to it. The motion is transmitted from this shaft to a second countershaft N either directly, that is to say, in the same direction of rotation by the wheel L on shaft K gearing with wheel M of shaft N, or indirectly, that is to say, in the opposite direction, by wheel R on shaft K gearing with wheel P on shaft N through the intermediate wheel Q loose on its shaft. The two wheels M P are loose on shaft N and can be coupled to the clutch O, that slides upon shaft N between M. and P and rotates with the same, so that by coupling either wheel to shaft N the latter will be turned in either direction for the purpose of running forward or backward. The shaft N is supported at one end by a bearing in the bracket T and at the other in a recess in shaft G', which carries the two sprocket wheels U, one of which has a sprocket chain leading to the front wheel axle $F^2$, while the other leads to the rear axle F'. The two disks S S' of a friction clutch are fixed on the shafts N and G' respectively and are kept apart by springs.

The shaft N can be shifted longitudinally in its bearings, so as to throw the friction clutch S S' into or out of action, this being effected by a screw W carried by the block T' and having at its other end a toothed wheel Z with which gears a pinion Z' on the upper shaft $y$. This shaft is rotated from the rods $t$ by intermediate bevel gears $w$ $w'$. The rods extend to both platforms and are rotated by hand wheels $r$ and chain and sprocket connections. The shifting of the two clutches G, O, is effected by means of rods $g$ $o$ provided with forks $s$ and extending to the platforms, from which they are governed by the reversing levers $h$ and $h^2$. Consequently the friction clutch S S' is used for driving the axles F' and F$^2$, that is to say, for running or for standing still; the clutch O for running backward or forward as described, and finally the clutch G is used for transmission of motion from shaft B to shaft K for running fast or slow.

The method of operating is as follows:— The motor engines run continuously and the motion of their crank shaft is transmitted by the wheels A A' to the shaft B. The wheels H Q thereon being loose, the other gear wheels stand still. By turning the hand wheel $r$ to the right, the friction clutch S S' is thrown in but even then no motion ensues. To start at a slow speed, the clutch G is moved over so as to gear with wheel H by moving the lever $h$ under the hand wheel to the right. By this means the motion of the shaft B is transmitted through wheel J to the shaft K;—from this to wheel M through wheel L and through wheels R and Q to wheel P. In consequence of the proportion of the diameters of H and J the speed of rotation of shaft K will be proportioned to that of shaft B as about one is to three. The carriage will not start, as the wheels M P are loose on the shaft N, until by moving the second lever $h^2$ over to the right, the clutch O is thrown in gear with wheel M for the forward motion, whereby the shafts N and G' will be rotated in the same direction as shaft B. If it be desired to increase the speed, the lever $h$ is moved over to the other side so as to bring clutch G out of gear with wheel Q. The shaft K will then run at the same speed as B in consequence of the equal diameters of Q and R. If it be desired to pass from running forward to running backward, the lever $h^2$ is moved over to the left, thus throwing clutch O out of gear with wheel M and into gear with wheel P; the rotation of shaft K will then be transmitted through wheel R by means of wheel Q to wheel P and shaft N, the wheels L M running idle with a resultant slow backward motion. When running backward rapidly the transmission of the motion of shaft B is effected directly through wheels P Q to shaft N; J H and R as well as L M running idle. A rotation of the hand wheel to the left, while at the same time applying the brakes, will cause the friction clutch S S' to be thrown out of gear and bring the vehicle to a stand still, whether it is running forward or backward. The other gearing may then continue to be rotated by the engines without doing any damage. This arrangement of the whole driving gear so as to work by itself and only to be connected with the wheel axles through the friction clutch is of great importance in case of accidents or running off the rails.

When the motor engines are to be removed the hinged flap like parts or doors 12 located at the sides of the car are lifted up, thus permitting the engines together with the frames to be drawn out and exchanged for others.

What I claim as new, and desire to secure by Letters Patent, is—

1. In a tram car the combination of the motor engines mounted under the seats of the car upon suitable removable frames, hinged flaps or doors opening outwardly on the sides of the car for removing the motor engines, a driving gear, substantially as described, mounted in suitable hangers removably secured to the bottom of the car, whereby both engines and driving gear are rendered independently exchangeable, and the penetration of obnoxious gases to the interior of the car is prevented, substantially as described.

2. In a tram car a driving gear mounted to be exchangeable, and consisting of a shaft B in connection with the driving shaft of the engine, and provided with two loose gears H Q of unequal diameter, a clutch coupling playing between said gears, a coupling shaft N G' provided on one part N with two loose gears M P and an intermediate coupling O, and on its other part with transmission wheels U connected respectively with the axles of the cars, a third or countershaft K provided first with a fast gear J meshing into the gear H of shaft B; secondly, with a fast gear R meshing with gear Q of shaft B and with gear P of shaft N G', and thirdly, with a fast gear L meshing with gear M on shaft N G', and means for operating the several couplings, substantially as described.

3. In a tram car, the combination of a motor, a coupling shaft consisting of two parts N G' and an intermediate coupling S S' uniting said parts, two loose gears P, M, mounted on the part N, a coupling O intermediate of said gears, an operative connection between the axle of the car and the second part G' of the coupling shaft;—all constructed and arranged so that the motion of the motor is transmitted to the axle only when said coupling O is thrown into connection with either of said gears P M and the parts of the shaft coupling S S' are in connection; otherwise the transmission runs idle, substantially as described.

4. In a tram car, a transmission gear comprising a separate gear transmission for each of the several speeds and direction of motion to be imparted to the car, to wit: first, a transmission by gears H J L and M, for a slow forward motion; secondly, a transmission by gears Q R L and M, for a quick forward motion; thirdly, a transmission by gears H J R Q and P for a slow backward motion; and fourthly, a transmission by gears Q P for a quick backward motion, all constructed and arranged as specified, so that gears which are not in use run idle and thereby permit rapid changes from one motion to another, substantially as described.

In testimony whereof I have signed my name to this specification in the presence of two subscribing witnesses.

CARL LÜHRIG.

Witnesses:
    WILHELM WIESCHEMANN,
    ERNST DEMUTH,
        *Both of Reichs str., 30, Dresden.*